(No Model.) 2 Sheets—Sheet 1.

N. FEIGLEY.
COMBINED BRAKE AND FENDER.

No. 593,839. Patented Nov. 16, 1897.

Witnesses
Frank B. Shight
W. H. Timmermann

Inventor
Newton Feigley.
By Henry C. Evert Attorney (No Model.) 2 Sheets—Sheet 2.
N. FEIGLEY.
COMBINED BRAKE AND FENDER.
No. 593,839. Patented Nov. 16, 1897.
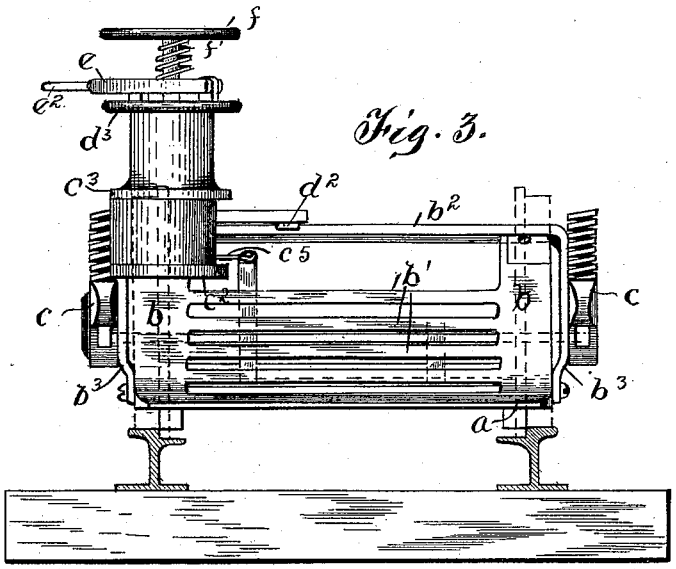
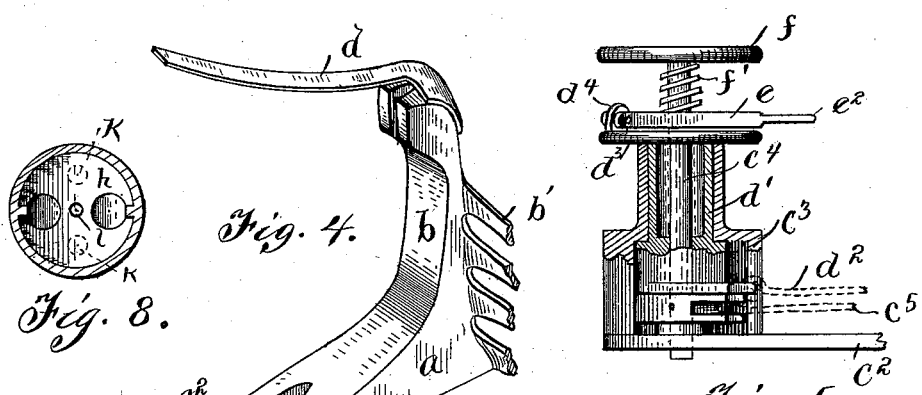
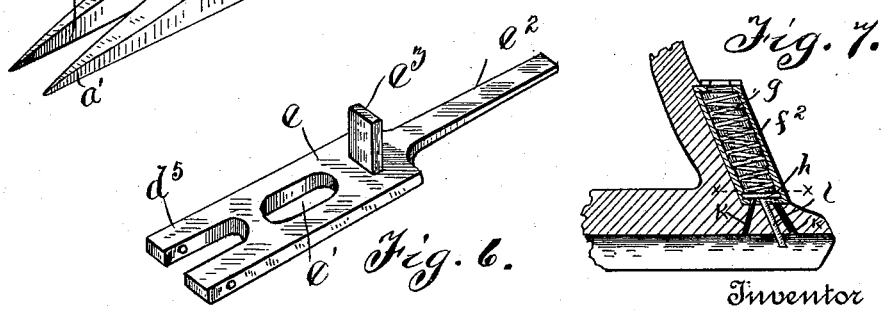
Witnesses
Frank H. Stright
W. H. Timmerman
Inventor
Newton Feigley
By Henry C. Evert Attorney

UNITED STATES PATENT OFFICE.

NEWTON FEIGLEY, OF PITTSBURG, PENNSYLVANIA, ASSIGNOR OF ONE-FOURTH TO JAMES E. O'DONNELL, OF SAME PLACE.

COMBINED BRAKE AND FENDER.

SPECIFICATION forming part of Letters Patent No. 593,839, dated November 16, 1897.

Application filed July 16, 1897. Serial No. 644,759. (No model.)

*To all whom it may concern:*

Be it known that I, NEWTON FEIGLEY, a citizen of the United States of America, residing at Pittsburg, in the county of Allegheny and State of Pennsylvania, have invented certain new and useful Improvements in a Combined Emergency Brake and Fender, of which the following is a specification, reference being had therein to the accompanying drawings.

This invention relates to certain new and useful improvements in combined emergency brakes and fenders, and has for its object to provide novel and effective means for suddenly checking the speed of a car when an emergency arises and to lower the fender into position so that any object to be engaged thereby will be prevented from passing to the wheels of the car.

The invention further aims to construct a combined brake and fender of a nature that will not in any manner interfere with the operation of the ordinary brakes and that may also be applied to various styles and forms of trucks, and which when in its normal position will be supported in a manner to retain the shoes out of engagement with the wheels and rails, and to provide means whereby when released these shoes will drop into engagement with the rails in such a manner as to cause the wheels of the truck to engage the shoes and instantly check the speed of the car.

The invention further aims to provide a combined emergency brake and fender that will be extremely simple in its construction, strong, durable, effectual in its operation, and comparatively inexpensive to manufacture; and the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
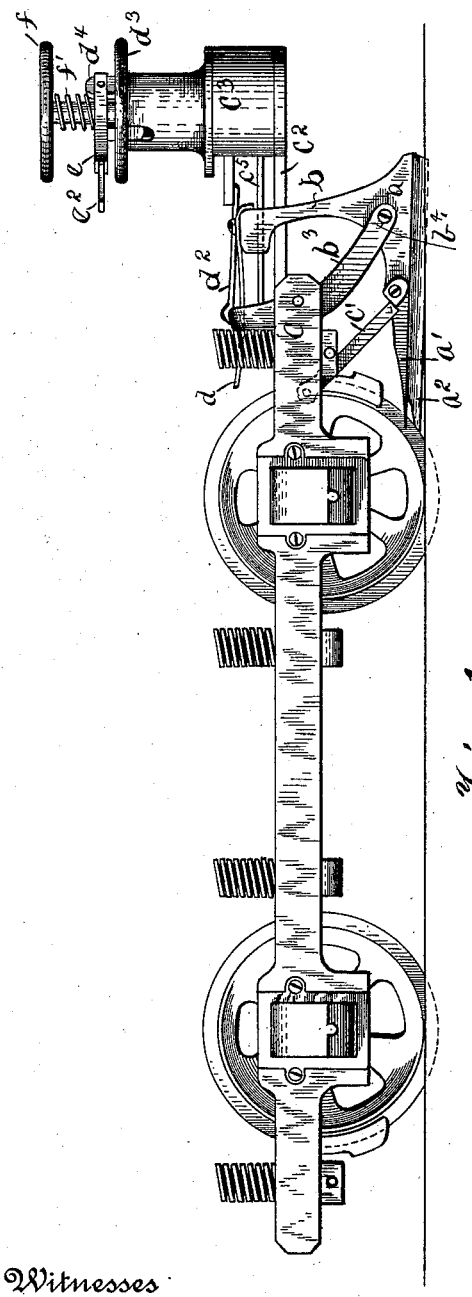
Figure 2:
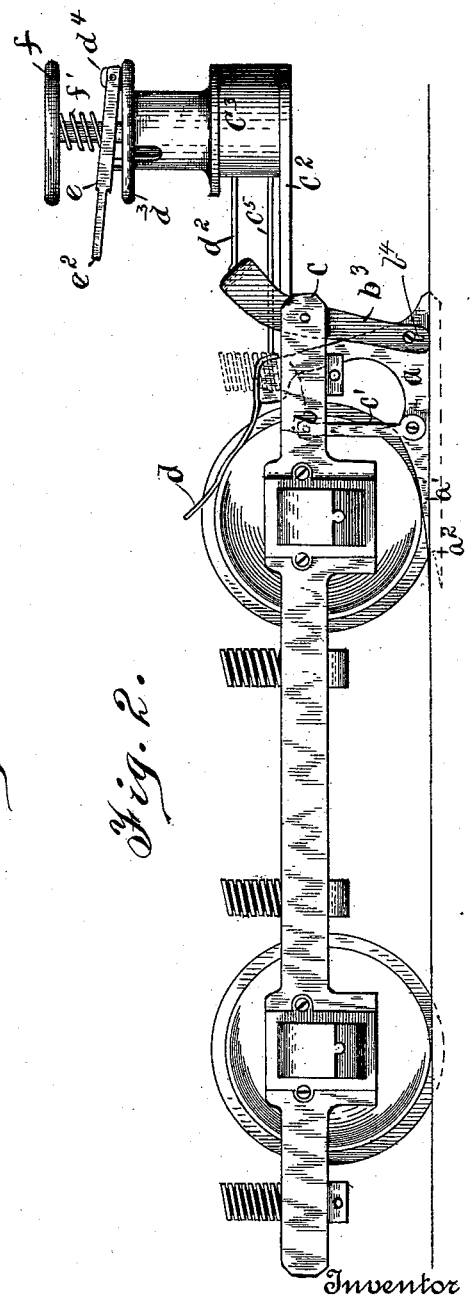

Figure 1 is a side elevation of a truck, showing my improved brake and fender in the elevated position. Fig. 2 is a similar view of a truck, showing the brake in the engaging position. Fig. 3 is a front elevation of my improved brake and fender in position on the truck. Fig. 4 is a perspective view of one of the brake-shoes, showing a portion of the cross-strips forming the fender. Fig. 5 is a side view, partly in section, of the operating shaft and wheel for both the ordinary wheel-brake and my improved emergency-brake. Fig. 6 is a perspective view of the locking-lever for the emergency-brake. Fig. 7 is a sectional view of the point of fender and brake combined with oil-cup attached. Fig. 8 is a sectional view on line X X of Fig. 7.

Referring now to the drawings by reference-letters, $a$ represents the brake-shoe, which is supported in a horizontal position by means of the upright or standard $b$, formed integral with said brake-shoe and extending upwardly above the truck-frame $c$, and has secured on its upper end a spring-strap $d$, extending rearwardly and adapted to come in frictional contact with the tread of the wheel when the brake is applied, so as to partially check the speed of the car previous to the engagement of the car-wheel with the brake-shoe $a$. This brake-shoe $a$ is provided with a bifurcated end $a'$, which forms a recess $a^2$, extending inwardly into the shoe and adapted to receive the flange of the car-wheel when the said wheel comes into engagement with the shoe. The uprights or standards $b\ b$ of each shoe are connected together by means of slats or cross-strips $b'$, which may be formed integral therewith or secured in any suitable manner to the uprights, as may be desired, and serve the purpose of a car-fender. The brake-shoes are supported by means of a cross-brace $b^2$, pivotally supported from the beam $c$ of the truck and having downwardly-extending arms $b^3$, which are pivotally connected to the brake-shoes $a$ through slots $b^4$ near the ends of said arms, the shoes being also supported near their center by a link $c'$, pivotally connected to the outside of the shoe and to the inner face of the truck-beam $c$. On the platform $c^2$ of the car is provided a casing $c^3$ for the operating mechanism of the ordinary brake and also of my improved emergency brake and fender, the operating-shaft $c^4$ of the ordinary brake having connected thereto the brake-rod $c^5$, and the operating mechanism for my improved emergency-brake consists of a shell $d'$ within the casing $c^3$ and through which the brake-shaft $c^4$ operates, the brake-rod $d^2$ being connected to said shell and to the supporting-brace $b^2$, said shell having secured on its upper end a brake-wheel $d^3$, having an upwardly-projecting lug $d^4$, to which is pivotally secured the bifurcated end $d^5$ of the locking-lever $e$, which is provided with an aperture $e'$ to receive the operating-shaft $c^4$, a handle $e^2$, and a downwardly-projecting lug $e^3$, which engages in an aperture provided in the brake-wheel $d^3$. Arranged on the operating-shaft $c^4$, between its operating-wheel $f$ and the locking-lever $e$, is a coil-spring $f'$, which serves to force the lug $e^3$ of the locking-lever into the aperture in the brake-wheel $d^3$ when the said lug comes opposite its aperture.

The brake is retained normally in the position shown in Fig. 1 of the drawings, and when in this position the ordinary brake may be used without being in any manner interfered with. When, however, it is desired to employ the emergency-brake, the locking-lever $e$ is raised by means of its handle $e^2$, which withdraws the lug $e^3$ from its engagement with the aperture in the wheel $d^3$ and permits the brake-shoes to fall by reason of their own weight into engagement with the rails of the track. As these brake-shoes are descending the spring-straps $d$ will come in engagement with the upper periphery of the tread of the car-wheel and by reason of their frictional contact therewith serve to partially decrease the speed of the car previous to the engagement of the car-wheel with the brake-shoe. As this brake-shoe, however, comes into perfect contact with the rail of the track, it will be observed that the same is thrust in under the car-wheel, the flange thereof entering the recess $a^2$, provided in the brake-shoe, and the tread of the wheel riding upward on the inclined face of this shoe and entirely stopping the revolving of the two front wheels of the truck, and by reason of the brake-shoes being in firm engagement with the rails almost instantly checking the momentum of the car. The emergency-brake may be readily lifted again to its normal position by backing the car sufficiently to remove the car-wheels from the brake-shoes and the shoes then lifted by means of the brake-wheel $d^3$, the lug $e^3$ being forced into the aperture in this wheel by means of the spring $f'$ when the wheel is turned so as to bring the lug opposite its aperture.

Fig. 7 shows the point of the brake and fender with an oil-cup $f^2$ attached thereto. Said cup is provided on the inside with a spring $g$, operating against valve $h$ to hold it against the valve-seat to prevent the oil from escaping through openings $k$.

Secured to the under side of the valve is a rod $l$, passing through an opening in the point of the brake-shoe and extending below the engaging face of the shoe. Said rod serves to operate the valve to allow the oil to escape when the brake is applied. It will also be noted that various changes may be made throughout the details of construction without departing from the general spirit of my invention.

Having fully described my invention, what I claim as new, and desire to secure by Letters Patent, is—

1. In a combination brake and fender, the brake-shoes having upwardly-extending portions with spring-straps secured thereto, supporting-braces attached to said shoes and the car-truck, a brake-rod connected to one of said braces, a locking mechanism for holding said shoes in the elevated position, strips connecting said shoes and extending transversely of the car to form the fender, substantially as shown and described.

2. In a brake of the class described, the brake-shoes having an upwardly-extending portion with spring-straps secured thereto, supporting-braces attached to said shoes and car-truck, a brake-rod connecting to one of said braces, a locking mechanism for holding said shoes in the elevated position, substantially as shown and described.

In testimony whereof I affix my signature in presence of two witnesses.

NEWTON FEIGLEY.

Witnesses:
H. C. EVERT,
THOS. M. BOYD, Jr.